United States Patent Office.

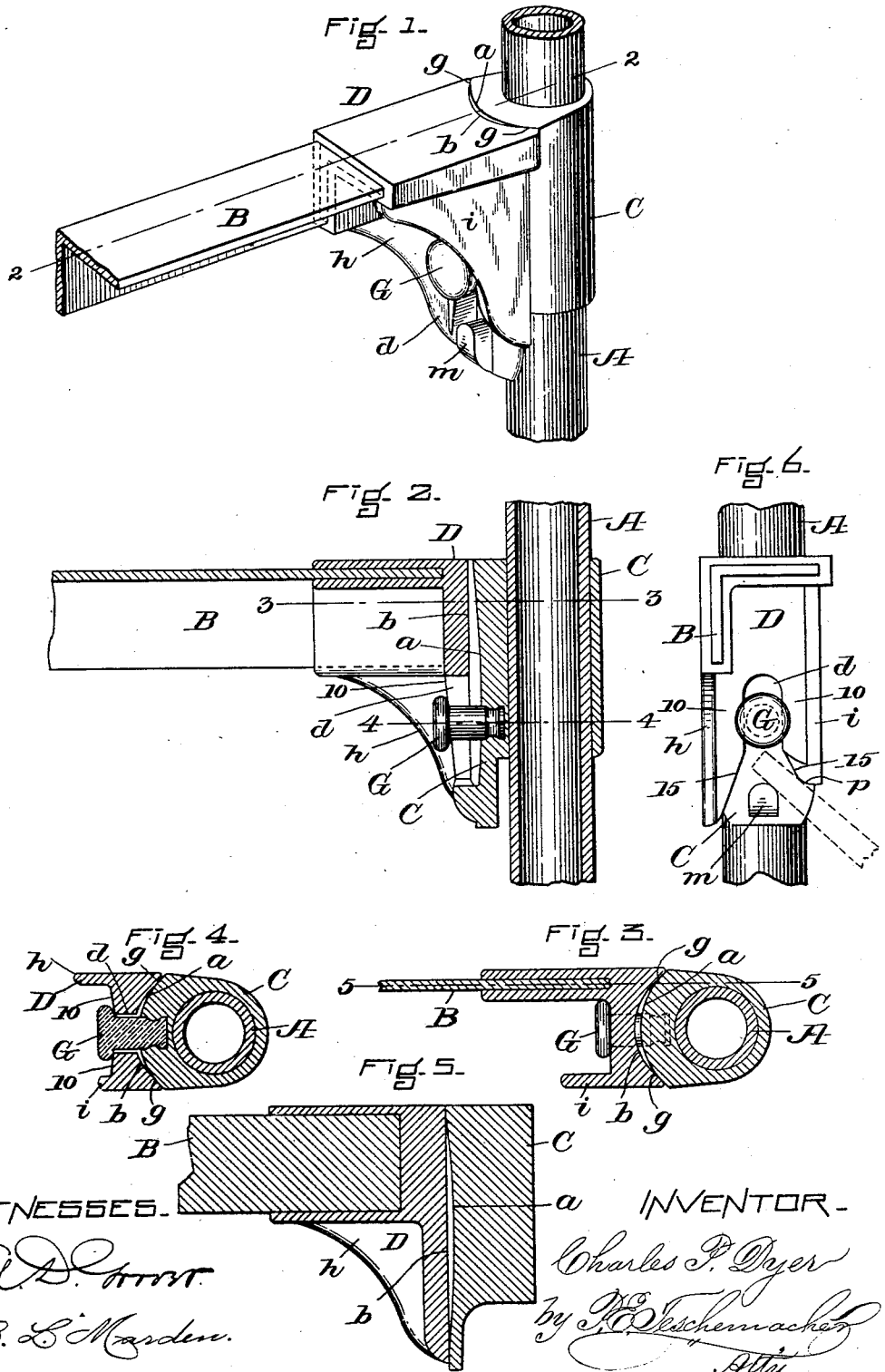
C. P. DYER.
DETACHABLE JOINT FOR METALLIC BEDSTEADS.
No. 591,960. Patented Oct. 19, 1897.

CHARLES P. DYER, OF SOMERVILLE, MASSACHUSETTS, ASSIGNOR, BY DIRECT AND MESNE ASSIGNMENTS, TO LUCY E. DYER, OF SAME PLACE, AND MARY C. DARROW, OF BOSTON, MASSACHUSETTS.

DETACHABLE JOINT FOR METALLIC BEDSTEADS.

SPECIFICATION forming part of Letters Patent No. 591,960, dated October 19, 1897.

Application filed May 20, 1897. Serial No. 637,442. (No model.)

*To all whom it may concern:*

Be it known that I, CHARLES P. DYER, a citizen of the United States, residing at West Somerville, in the county of Middlesex and State of Massachusetts, have invented certain new and useful Improvements in Detachable Joints for Metallic Bedsteads, of which the following is a full, clear, and exact description, reference being had to the accompanying drawings, making part of this specification, in which—

Figure 1 is a perspective view of a portion of a metallic-bedstead corner-post and rail provided with my improved joint. Fig. 2 is a longitudinal vertical section of the same on the line 2 2 of Fig. 1. Fig. 3 is a transverse vertical section on the line 3 3 of Fig. 2. Fig. 4 is a transverse vertical section on the line 4 4 of Fig. 2. Fig. 5 is a longitudinal vertical section on the line 5 5 of Fig. 3. Fig. 6 is an end elevation of the joint.

The ordinary detachable dovetail joint hitherto employed for connecting the rails and corner-posts of metallic bedsteads is objectionable as it soon becomes loose from wear, and consequently will not hold the parts rigidly together as desired.

My invention has for its object to overcome this difficulty and to provide a joint that will not become loose or rock in any direction; and to this end my invention consists in a joint of novel construction, in which the faces of the two opposing members are caused to bear against each other at the top and bottom only, said members being held together at a point intermediate between said bearing-points by means of a headed stud projecting from one member which engages a slot in the other member, suitable inclines at the sides of the slot acting as wedges under the head of the stud, to keep the two members of the joint at all times firmly in contact, as hereinafter more fully described.

In the said drawings, A represents a portion of a corner-post of a metallic bedstead, B a portion of one of the bedstead-rails, and C D the two members of the joint by which said post and rail are held together. The member C consists of a sleeve which encircles the post A at the desired level and is adapted to be shrunk on, or otherwise secured in place. One side of the sleeve C is thickened, and has a transversely convex face $a$, against which fits the concave face $b$ of the opposite member D of the joint, said member being properly shaped to receive the end of the angle-iron rail B, which is securely fastened thereto. The two members C D are held securely in contact by means of a headed stud G, projecting from the member C and engaging an open slot $d$ in the vertical portion of the member D, the surfaces 10 on opposite sides of the slot being inclined to form wedges which fit under the head of the stud G, thus tightening the joint as the member D is slid downward on the member C. The side walls of the slot are flared outward at the bottom, as shown at 15 15, Fig. 6, to facilitate the entrance of the stud G in case the two members of the joint should not be brought exactly opposite to each other. The opposing faces of the two members C D are of different transverse curvatures, whereby said faces are separated at the center and caused to bear against each other near the edges only, as shown at $g$ $g$, Figs. 1, 3, and 4, thus preventing any rocking motion of one member upon the other in a transverse direction, when held by the stud and slot, while one member, preferably the member C, has its face $a$ made concave longitudinally, as shown in Figs. 2 and 5, whereby the opposing faces of the two members are caused to bear against each other at the top and bottom only, the third or intermediate bearing being under the head of the stud G, and consequently there can be no rocking of the joint either in a vertical or transverse direction under any strain to which it can be subjected, any wear of the parts being at once taken up by the inclines 10 acting on the head of the stud G as the rail member D is forced downward by the weight naturally put upon the bedstead when in use.

A bedstead having my improved joint applied thereto will always stand perfectly upright and will be perfectly firm and steady under usage of the roughest description.

The outside flange $h$ of the member D extends downward sufficiently to prevent the stud G from being seen from the outside of the bedstead, and the inside flange $i$ is made somewhat shorter than the outside flange $h$, to enable a bar or lever (shown dotted in Fig. 6) to be placed between its lower end $p$ and the top of a lug $m$, projecting from the bottom of the face of the member C, said lug $m$ forming a fulcrum to enable the lever to raise the member D, when it is desired to disengage the slot from the stud G, when the bedstead is to be taken apart.

What I claim as my invention, and desire to secure by Letters Patent, is—

1. In a bedstead-joint, the combination of two members having oppositely-curved contacting faces held together by a headed stud on one member, engaging a slot in the other member, and one of said faces being of longitudinally concave form, whereby it is caused to bear against the face of the opposite member at the top and bottom only, while held at a point intermediate between said upper and lower bearings by said stud and slot, substantially as described.

2. A bedstead-joint consisting of two members, the opposing faces of which are respectively concave and convex in cross-section and of different transverse curvatures, whereby they are caused to bear against each other, near the edges only, and one of said members being provided with a headed stud engaging a slot in the other member and taking a bearing against inclined or wedge-shaped surfaces at the sides of said slot, and the opposing face of one member being made concave longitudinally, whereby said members are caused to bear against each other at the top and bottom only, with an intermediate bearing under the head of the connecting-stud, substantially as set forth.

3. A bedstead-joint consisting of a sleeve member, encircling the corner-post of the bedstead and a rail member for receiving the end of the rail, said members having contacting faces oppositely curved transversely and held together by a headed stud on the sleeve member, engaging a slot in the rail member and taking a bearing against inclined surfaces at the sides of said slot, said contacting faces being of different transverse curvatures, whereby they are caused to bear against each other at the edges only, and the face of one member being concaved longitudinally, whereby said members are caused to bear against each other at the top and bottom only, while held at a point intermediate between said upper and lower bearings by said stud and slot, substantially as described.

4. In a bedstead-joint, the combination with the two members C, D, having oppositely-curved contacting faces sliding the one upon the other and held together by a headed stud G, on the member C, engaging a slot in the member D, of the lug or projection $m$, extending from the face of the member C, beneath the stud G, and forming a fulcrum for a bar or lever, whereby the member D may be raised to disengage it from the member C, substantially as set forth.

Witness my hand this 15th day of May, A. D. 1897.

CHARLES P. DYER.

In presence of—
P. E. TESCHEMACHER,
B. L. MARDEN.